April 9, 1963   A. J. CLAPP   3,084,858
AIRCRAFT TAKE-OFF DISTANCE COMPUTER
Filed Dec. 30, 1959   3 Sheets-Sheet 1
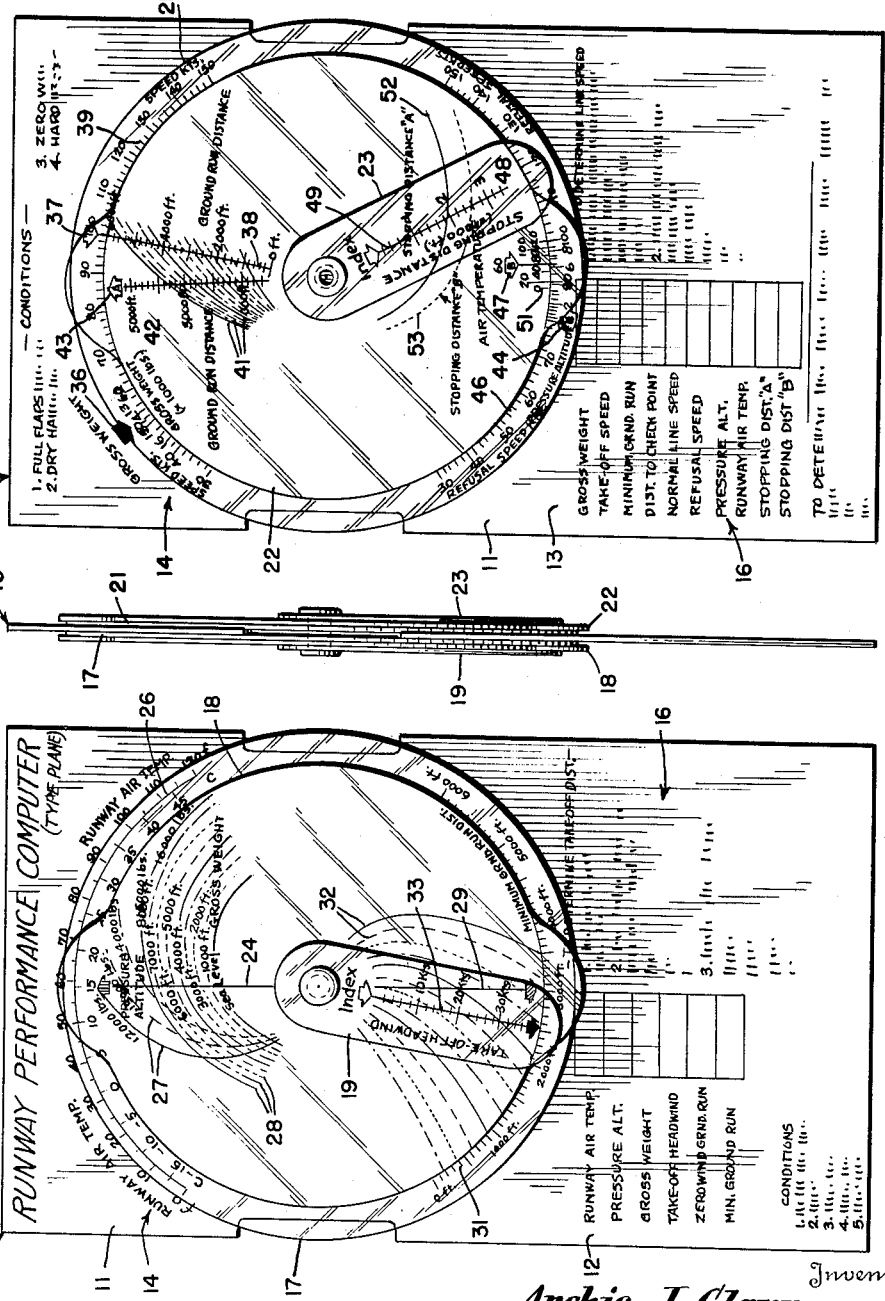
Inventor,
Archie J. Clapp
By W B Childs
Attorney April 9, 1963

A. J. CLAPP 3,084,858

AIRCRAFT TAKE-OFF DISTANCE COMPUTER

Filed Dec. 30, 1959

Inventor,
Archie J. Clapp

By

Attorney

April 9, 1963
A. J. CLAPP
3,084,858
AIRCRAFT TAKE-OFF DISTANCE COMPUTER
Filed Dec. 30, 1959
3 Sheets-Sheet 3
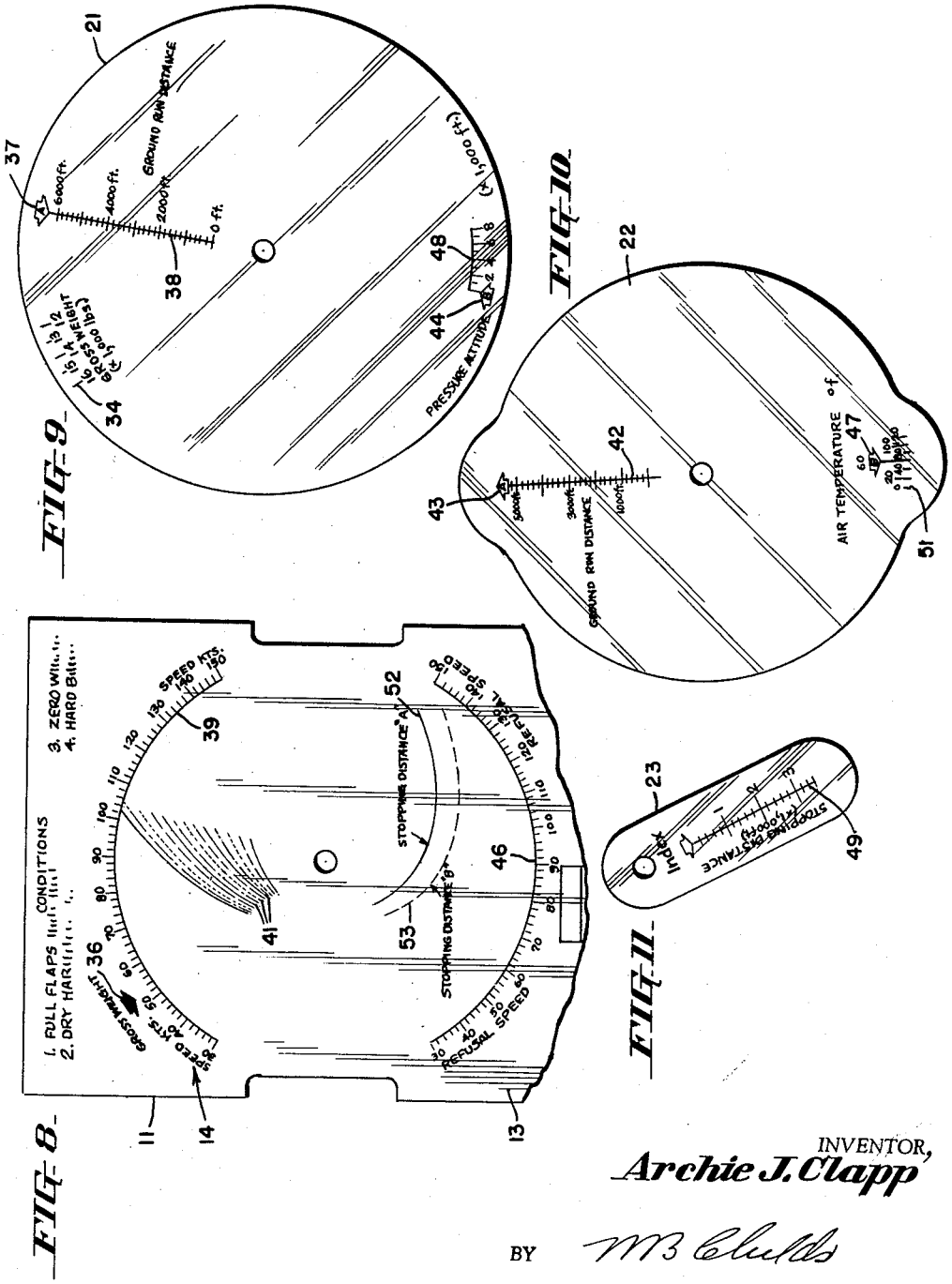
INVENTOR,
*Archie J. Clapp*
BY
ATTORNEY United States Patent Office 3,084,858
Patented Apr. 9, 1963

3,084,858
AIRCRAFT TAKE-OFF DISTANCE COMPUTER
Archie J. Clapp, 6218 30th St. NW., Washington 15, D.C.
Filed Dec. 30, 1959, Ser. No. 863,055
12 Claims. (Cl. 235—84)
(Granted under Title 35, U.S. Code (1952), sec. 266)

The invention described herein may be manufactured and used by or for the Government of the United States of America for governmental purposes without the payment of any royalties thereon or therefor.

This invention relates to a runway performance computer and more particularly, to a device for computing various critical distances and speeds required for safe aircraft take-off.

In order to prevent an aircraft from over-shooting the runway on a take-off attempt, it is required that the pilot be familiar with various factors concerning both the aircraft and the runway. These factors, required to be known for a safe take-off, are (1) the minimum ground run distance or the distance required for take-off, (2) the speed required to become airborne, (3) the line speed at a preselected distance on the runway or the speed that the aircraft must attain at the preselected distance in order to become airborne at the minimum ground run distance and (4) the distance required to stop the aircraft when a decision is made to abort the take-off. Prior art devices for computing these factors are merely a series of graphs or charts on which the pilot is required to construct a series of lines to obtain intermediate information, and then transpose this information to other charts. This procedure is repeated on successive charts until a final calculation is obtained. This procedure of constructing and transposing lines on a plurality of graphs is cumbersome and time consuming when required to be performed in the cockpit of an aircraft.

It is therefore an object of the present invention to provide a small self-contained computer which will calculate the required runway performance factors by manipulation of various indicia carrying members.

Another object of the present invention is to provide a runway performance computer in which all variable input to the computer necessary to arrive at a final calculation are retained for visible examination to provide a fast check of the final calculation.

Another object of the present invention is to provide a runway performance computer having a plurality of transparent indicia carrying members whereby the indicia on the members are aligned in relation to one another for attaining a final calculation.

Another object of the present invention is to provide a runway performance computer for calculating minimum ground run distance, speed required to become airborne, runway line speed and required stopping distance.

With these and other objects in view, the present invention contemplates a base card on which a plurality of sets of transparent members are rotatably mounted on a common axis. Indicia representing the variable conditions affecting aircraft ground run distance, aircraft line speed, and required stopping distance are placed on the card and the sets of transparent members so that the indicia may be aligned to obtain final calculations of the minimum ground run distance, line speed at an intermediate check point on the runway and the distance required to stop the aircraft after a preselected speed has been attained. The indicia are positioned on the base card and transparent members in preselected pattern to allow the transparent members to be rotated in a predetermined sequence such that all alignments of indicia preliminary to the final calculations are retained.

Other objects, advantages and novel aspects of the invention will become apparent upon consideration of the following detailed description in conjunction with the accompanying drawings wherein:

FIGS. 1–3 are front, side, and rear views respectively, of a runway performance computer embodying the features of the present invention.

FIG. 8 is a fragmentary view of the rear face of the base card of the computer shown in FIG. 3 disclosing the indicia placed thereon, and FIGS. 9–11 are views of separated indicia carrying members normally mounted on the rear face of the computer shown in FIG. 3.

Figure 5:
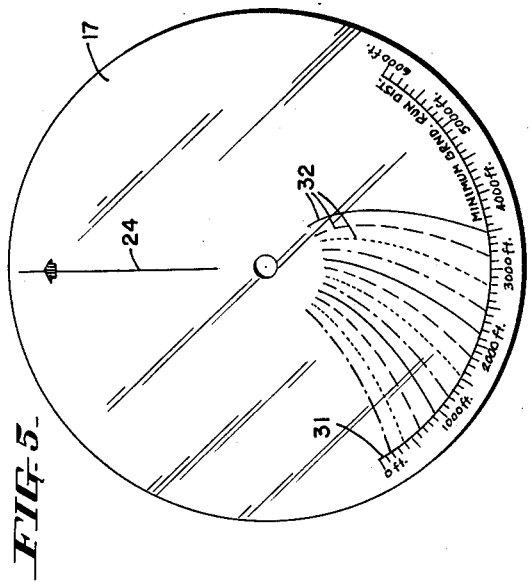
FIGS. 5–7 are views of separated indicia carrying members normally mounted on the front face of the base card shown in FIG. 4.

Attention is now directed to FIGS. 1–3 wherein a runway performance computer generally designated by the numeral 10 is shown. The computer 10 comprises a base card 11 which may be constructed of, for example, a plastic material having a matte surface of the type which will permit pencil markings to be easily placed on and erased from the surface. A front face 12, and a rear face 13 of the base card 11 is provided with two types of indicia or markings. The first type, generally designated by the numeral 14, is indicia in the form of scales and graphs which are necessary to compute runway performance. The second type, generally designated by the numeral 16, is printed information in the form of operating instructions for the computer, spaces for the recording of known and computed information and the general conditions under which the computer is to be operated, as for example, the particular aircraft flap and engine settings and runway conditions.

The front face 12 of the base card 11 is provided with three indicia carrying members designated by the numerals 17–19, respectively. In the preferred embodiment of this invention, the members 17–19 are made of a transparent material, as for example, a plastic material, and are coaxially mounted for rotation on the base card 11. The indicia 14 on the front face 12 of the base card 11 and the indicia on the three transparent members 17–19 represent the variable conditions affecting the minimum required runway distance for an aircraft to become airborne, generally referred to as the minimum ground run distance.

The rear face 13 of the base card 11 is likewise provided with three transparent indicia carrying members 21–23, respectively, which are shown rotatably mounted for concentric rotation on the rear face 13 of the base card 11. The indicia 14 on the rear face 13 and the indicia on the members 21–23 represent the variable conditions affecting the line speed which a properly operating aircraft should attain at a predetermined check point on the runway if the aircraft is to become airborne at the minimum ground run distance computed on the front face 12 of the computer 10. The indicia on the face 13 and on the members 21–23 are also representative of the variable conditions affecting the required distance to stop the aircraft after a preselected speed has been attained. The indicia on the members 17–19 and 21–23 are placed on the card in a position sequence in the order in which the indicia are used. That is, the indicia which is to be aligned first, is placed on the card and the adjacent member 17 or 21 and the next indicia to be aligned is placed on the next member 18 or 22 and so forth whereby the members will be moved in the sequence of the member adjacent to the card outwardly to the top member.

In the preferred operation of the computer 10, a pilot about to attempt a take-off should first compute the minimum ground run distance which is required for the aircraft to become airborne through the use of the front face 12 of the computer 10 in conjunction with members 17-19. This computation will enable the pilot to ascertain whether or not the runway is of a sufficient length for the take-off. After determining the minimum ground run distance, the pilot then uses the rear face 13 of the computer 10 in conjunction with the member 21-23 and uses the computation of minimum ground run distance to compute the required speed for take-off for the aircraft and also the line speed which the aircraft should attain at a preselected check point on the runway if the aircraft is operating properly. If during the take-off, the calculated line speed is not attained when the aircraft reaches the preselected check point, the pilot then knows that the aircraft is not operating properly. The pilot should calculate before the take-off is attempted whether or not there is sufficient distance remaining on the runway on which to abort his take-off, and recalculate using a different check point should there be insufficient distance remaining. This calculation is also made with the indicia 14 on the rear face 13 of the card 11 and indicia on the members 21-23. After these calculations, the pilot then knows all the factors necessary for a safe and successful take-off in that he is familiar with whether or not the runway is of a sufficient length for a take-off, the required take-off speed, the line speed the aircraft should attain at a predetermined check point on the runway and whether or not there will be sufficient distance to stop the aircraft if the line speed is not attained at the check point.

*Minimum Ground Run Distance Computation*

Figure 7:
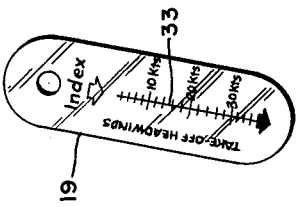
Figure 4:
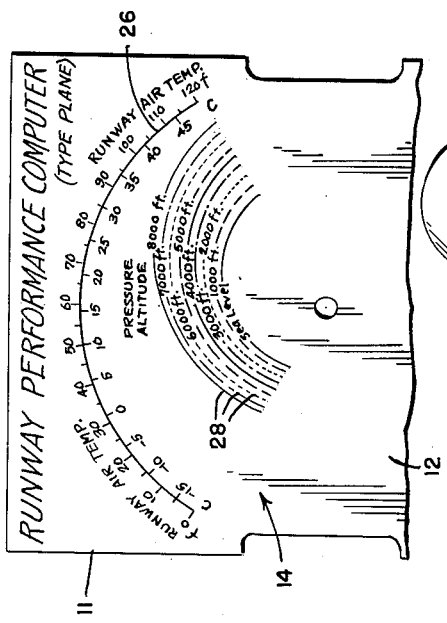
FIG. 4 is a fragmentary view of the front face of a base card of the computer shown in FIG. 1.
Figure 6:
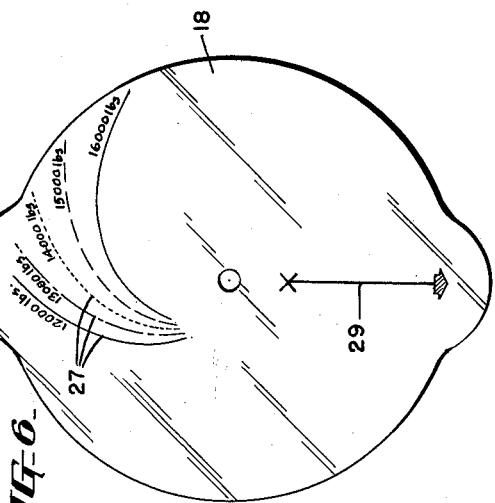

The computation of minimum ground run distance is made with the use of the indicia on the front face 12 of card 11 and the indicia on members 17-19 shown in FIGS. 1 and 4-7. In the first step of this computation, the pilot rotates the member 17 until an arrow on an indicating line 24 points to the air temperature of the runway which is represented by an arcuate scale 26 on the front face 12. The second step of the computation is to select the applicable gross weight, polar coordinate curve 27 on the member 18 and to rotate the member 18, while retaining the member 17 stationary, until the applicable gross weight curve 27 crosses a point where the indicating line 24 crosses the applicable pressure altitude, polar coordinate curve 28 on the front face 12 of card 11. With the members 17 and 18 so aligned, an arrow on the indicating line 29 of the member 18 points to the minimum ground run distance on an arcuate scale 31 on the member 17 for zero wind.

Next, the pilot notes the polar coordinate, headwind curve 32 on the member 17 which is closest to the vertex of an X on the indicating line 29 of member 18. The member 19 is then moved, while retaining the members 17 and 18 stationary, until the applicable take-off head wind on a scale 33 crosses the noted curved line 32. An arrow at the bottom of the scale 33 then points to the minimum ground run distance on the scale 31. As all of the alignments of indicia on the front face 12 and on the members 17-19 which were necessary to obtain the final calculation of minimum ground run distance are still aligned, the pilot may then make a quick check to insure that the alignments were correctly performed.

*Line Speed Computation*

The line speed computation is made with the use of the indicia on the rear face 13 of the card 11 and the indicia on the transparent members 21-23 shown in FIGS. 3 and 8-11. In the first step of the computation, the pilot selects a check point on the runway somewhere intermediate the starting position of the take-off and the calculated minimum ground run distance. Next, the member 21 is rotated until the applicable aircraft gross weight on a gross weight scale 34 on the member 21 is opposite a gross weight mark or arrow 36 on the rear face 13. An arrow 37 on a scale 38 of the member 21, representing the zero wind minimum ground run distance calculated on the front side of the computer 10, indicates the speed required for take-off on a scale 39 on the rear face 13. The pilot then notes the speed versus distance polar coordinate curve 41 on the rear face 13 which crosses the zero wind minimum ground run distance on the scale 38 on the member 21. A scale 42 on the member 22, representing the ground run distance to the preselected check point, is aligned by movement of the member 22, while retaining the member 21 stationary, until the check point distance crosses the noted speed versus distance curve 41 on the rear face 13. The line speed which the aircraft should attain at the check point under normal operating conditions is indicated on the scale 39 on the rear face 13 by an arrow 43 at the extremity of the scale 42 on the member 22. The pilot can then review all alignments of indicia to check the final calculation of line speed.

*Computation of Stopping Distance*

Computation of stopping distance is performed on the rear side of the computer 10 with the use of the indicia 14 on the rear 13 of the base card 11 and indicia on the members 21-23. The stopping distance is computed with reference to a preselected speed, the speed normally being the line speed previously computed for the check point on the runway. Under these conditions, the pilot will know the maximum distance that is required to stop the aircraft if the line speed is not attained at the check point. The first step in the computation is to move the member 21 until an arrow or mark 44 on the member 21 points to the line speed, generally referred to as the refusal speed, on the scale 46 of the rear face 13. An arrow or mark 47 on the member 22 is then aligned by movement of the member 22, while retaining the member 21 stationary, with the applicable pressure altitude on a scale 48 on the member 21. The member 23 is then rotated, while retaining the members 21 and 22 stationary, until an index line of a stopping distance scale 49 coincides with the applicable runway air temperature on a scale 51 on the member 22. The minimum stopping distance is then indicated at the intersection of the stopping distance scale 49 on the member 23 and a polar coordinate curve 52 on the rear face 13. The stopping distance, including an average pilot reaction time of 3 seconds, for example, is indicated at the intersection of the scale 49 and a polar coordinate curve 53 on the rear face 13.

From the above description, it may be understood that the described computer provides a completely self-contained and easily manipulated computer which will calculate minimum ground run distance, line speed, and stopping distance for an aircraft prior to take-off. The computer also possesses the advantage of retaining all alignments of indicia preliminary to each of the final calculations such that once each calculation is completed all alignments of indicia may be checked by merely glancing at the computer.

It is to be understood that the above described arrangements are simply illustrative of the application of the principles of this invention. Numerous other arrangements may be readily devised by those skilled in the art which will embody the principles of the invention and fall within the spirit and scope thereof.

What I claim is:

1. A minimum ground run distance computer for aircraft comprising, a base card having a runway temperature scale thereon, said base card also having a plurality of pressure altitude curves thereon in juxtaposition to said temperature scale, said curves showing the effect of pressure altitude variation upon minimum-ground-run take-off distance, a first transparent member mounted on and movable relative to said base card, and having minimum ground-run distance scale thereon, said first transparent member having a temperature index line thereon, said line having an index point at one end thereof selectively alignable with a preselected temperature on said temperature scale, said temperature index line extending substantially transversely of and intersecting said pressure altitude curves upon alignment of said index point with a preselected temperature, a second transparent member, said second transparent member being superposed on, and movable relative to said base card and first transparent member, said second transparent member having a plurality of gross-weight curves thereon that show the effect of gross weight upon minimum ground-run take-off distance, said gross-weight curves being so arranged on said second transparent member so that a selected gross-weight curve is alignable with the point of intersection of said temperature index line with a preselected pressure altitude curve upon movement of the second transparent member relative to said first transparent member, and said second transparent member further including a ground-run index line formed thereon having an index line formed thereon having an index point at one end thereof and movable along said minimum ground-run take-off scale, upon the movement of said second transparent member relative to said first transparent member upon alignment of a preselected gross-weight curve with the point of intersection of said temperature index line, with a preselected pressure altitude curve, thereby providing an indication of minimum ground-run take-off distance, for zero headwind, for a given runway air temperature, pressure altitude and gross-weight.

2. A minimum ground run distance computer as set forth in claim 1 wherein, said first transparent member has thereon a group of curves that intersect said ground-run take-off scale and are intersected by said movable, ground-run index line, a third transparent member superimposed on said second transparent member and movable relative thereto, said third transparent member having a headwind index line thereon calibrated along its length in headwind velocity, and having an index point at one end juxtaposed to said ground-run scale, said third transparent member being selectively movable to a position of intersection of an appropriate headwind mark on said headwind index line with the curve on said first transparent member that is nearest the end of said ground-run index line most remote from the ground-run take-off scale, whereby minimum ground-run take-off distance for a given headwind may be calculated.

3. A minimum ground run distance computer for aircraft as set forth in claim 1, wherein, said runway air temperature scale is on the arc of a circle having its center on said card, and each of said transparent members is rotatably connected to the base card about an axis perpendicular to the card and forming the center of the circle upon which the runway air temperature scale is inscribed.

4. A minimum ground run distance computer for aircraft as set forth in claim 3 wherein, each of the respective sets of curves on said first and second transparent members are polar coordinate curves.

5. A minimum ground run distance computer for aircraft as set forth in claim 2, wherein, said runway air temperature scale is on the arc of a circle having its center on said card, and each of said transparent members is rotatably connected to the base card about an axis perpendicular to the card and forming the center of the circle upon which the runway air temperature scale is inscribed, and said third transparent member is rotatably mounted on the axis of said circle and is rotatable relative to said base card, and said first and second transparent members.

6. A line speed check computer for aircraft comprising, a base card having a speed scale, and a gross weight index point thereon, a first transparent member movably mounted on said base card and having a gross weight scale adjacent an edge thereof, said first transparent member further having thereon a ground run distance index line calibrated in feet, arranged to intersect said speed scale, and having an index mark located so as to be movable along said speed scale upon movement of said first transparent member relative to said base card, said base card further having thereon a plurality of acceleration curves juxtaposed to said speed scale showing the effect of acceleration upon velocity at various points along a predetermined ground-run take-off distance, a second transparent member superimposed on said first transparent member and said base card and movable relative to both, and having thereon a check-point ground-run distance index line calibrated in feet, said check-point ground-run distance index line extending towards said speed scale and having one end thereof adjacent said speed scale and having at said end an index marker, said gross weight scale and ground-run index line being so spaced on said first transparent member that upon alignment of a predetermined gross weight with said gross weight index mark on said base card, a preselected footage calibration mark on said ground-run index line intersects one of said acceleration curves and the index mark on said ground-run index line indicates take-off speed on said speed scale;

said second transparent member being so movable as to place a selected footage mark on said ground-run check-point distance index line in intersection with the same acceleration curve intersected by the preselected ground-run take-off distance mark on said ground-run distance index line, whereby the index mark on the ground-run check-point distance index line is caused to point to a speed on said speed scale which the aircraft must achieve at a predetermined check-point along a take-off ground run in order to attain take-off velocity after covering a predetermined ground-run take-off distance.

7. A line speed check computer for aircraft as set forth in claim 6 wherein, said velocity scale is imprinted on a portion of the circumference of a circle having its center on said base card, and both of said transparent members are substantially circular in form and are rotatably mounted on said base card at the center of said circle, and said acceleration curves are polar coordinate curves.

8. A stopping distance computer for aircraft comprising, a base card having thereon a refusal speed scale, and a group of deceleration curves juxtaposed to said scale and showing the relationship between velocity at a predetermined check point along a take-off run, and the distance required to decelerate to zero, for a given air temperature and pressure altitude, a first transparent member superimposed on said base card, movable relative thereto, having a pressure altitude scale and a refusal-speed index mark thereon, the index mark being alignable with a pre-selected refusal speed on said refusal speed scale, a second transparent member superimposed on said first transparent member and said base card, movable relative to both and having thereon an air temperature scale and a pressure altitude index mark so arranged as to be selectively alignable with a predetermined pressure altitude on said first transparent member, a third transparent member superimposed on said second transparent member and movable relative to said first transparent member, said second transparent member, and said base card and having thereon a stopping distance index line calibrated in feet and extending substantially at right angles to said air temperature scale and having one end thereof selectively alignable with a predetermined air temperature on said air temperature scale, at which time the stopping distance index line intersects the deceleration curve at a footage calibration mark on said stopping distance index line, thereby providing an indication of the required stopping distance for a particular aircraft for a predetermined refusal speed, pressure altitude, and air temperature.

9. A stopping distance computer as set forth in claim 8 wherein, said refusal speed scale is on an arc of a circle having its center on said base card, and said first, second, and third transparent members are mounted on said base card for rotation about the center of said circle.

10. A minimum ground run distance computer as set forth in claim 5 wherein, said first and second transparent members are circular, said second transparent member being of lesser diameter than said first transparent member and having diametrically spaced, outwardly extending tabs thereon, and said third transparent member is elongated and has one end pivotally attached to the base member.

11. A line speed check computer for aircraft as set forth in claim 7 wherein, said first and second transparent members are circular, said second transparent member being of lesser diameter than said first transparent member and having diametrically spaced, outwardly extending tabs thereon.

12. A minimum ground run distance computer as set forth in claim 5, further characterized by said base card having a reverse face upon which there is, a speed scale, and a gross weight index point, a first transparent member movably mounted on said reverse face and having a gross weight scale adjacent an edge thereof, said first transparent member further having thereon a ground-run distance index line calibrated in feet, arranged to intersect said speed scale, and having an index mark located so as to be movable along said speed scale upon movement of said first transparent member relative to said base card, said reverse face further having thereon a plurality of acceleration curves juxtaposed to said speed scale showing the effect of acceleration upon velocity at various points along a predetermined ground-run take-off distance, a second transparent member superimposed on said first transparent member and said reverse face and movable relative to both, and having thereon a check-point ground-run distance index line calibrated in feet, said check-point ground-run distance index line extending towards said speed scale and having one end thereof adjacent said speed scale and having at said end an index marker, said gross weight scale and ground-run index line being so spaced on said first transparent member that upon alignment of a predetermined gross weight with said gross weight index mark on said base card, a pre-selected footage calibration mark on said ground-run index line intersects one of said acceleration curves, and the index mark on said ground-run index line indicates take-off speed on said speed scale; said pre-selected footage calibration mark being the same as the minimum ground-run take-off distance computed on the opposite side of the base card, said second transparent member being so movable as to place a selected footage mark on said ground-run check-point distance index line in intersection with the same acceleration curve intersected by the pre-selected ground-run take-off distance mark on said ground-run distance index line, whereby the index mark on the ground-run check-point distance index line is caused to point to a speed on said speed scale which the aircraft must acheive at a pre-selected check-point along a take-off ground run in order to attain take-off velocity after covering a predetermined ground-run take-off distance.

References Cited in the file of this patent

UNITED STATES PATENTS

| | | |
|---|---|---|
| 2,007,986 | Sprague | July 16, 1935 |
| 2,190,281 | Berg | Feb. 13, 1940 |
| 2,585,618 | Batori | Feb. 12, 1952 |
| 2,617,591 | Kupersmit | Nov. 11, 1952 |
| 2,623,696 | Thrash | Dec. 30, 1952 |
| 2,767,919 | Huber | Oct. 23, 1956 |
| 3,013,720 | Steinkoenig | Dec. 19, 1961 |
| 3,023,954 | Gurney | Mar. 6, 1962 |